United States Patent
Gendler et al.

(10) Patent No.: US 10,437,315 B2
(45) Date of Patent: Oct. 8, 2019

(54) SYSTEM, APPARATUS AND METHOD FOR DYNAMICALLY CONTROLLING ERROR PROTECTION FEATURES OF A PROCESSOR

(71) Applicant: Intel Corporation, Santa Clara, CA (US)

(72) Inventors: Alexander Gendler, Kiriat Motzkin (IL); Arkady Bramnik, Kiryat Motzkin (IL); Lev Makovsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 15/629,872

(22) Filed: Jun. 22, 2017

(65) Prior Publication Data
US 2018/0373315 A1    Dec. 27, 2018

(51) Int. Cl.
| | | |
|---|---|---|
| *G06F 1/32* | (2019.01) | |
| *G06F 1/3287* | (2019.01) | |
| *G06F 11/10* | (2006.01) | |
| *G06F 1/324* | (2019.01) | |
| *G06F 1/3234* | (2019.01) | |
| *G06F 1/3296* | (2019.01) | |

(52) U.S. Cl.
CPC .......... *G06F 1/3287* (2013.01); *G06F 1/324* (2013.01); *G06F 1/3275* (2013.01); *G06F 1/3296* (2013.01); *G06F 11/1004* (2013.01); *G06F 11/1076* (2013.01)

(58) Field of Classification Search
CPC ................ G06F 1/32; G06F 1/28; G06F 1/26
See application file for complete search history.

(56) References Cited

U.S. PATENT DOCUMENTS

| | | | |
|---|---|---|---|
| 7,849,387 B2 | 12/2010 | Biswas et al. | |
| 9,116,729 B2 | 8/2015 | Cooray et al. | |
| 9,639,134 B2 | 5/2017 | Gendler et al. | |
| 2010/0194196 A1* | 8/2010 | Jouper | H02J 1/14 307/31 |
| 2015/0278017 A1* | 10/2015 | Trezise | G11C 5/04 714/764 |
| 2016/0299179 A1* | 10/2016 | Wu | G06F 1/26 |
| 2016/0313786 A1* | 10/2016 | Sasanka | G06F 12/0223 |
| 2017/0031412 A1 | 2/2017 | Gendler et al. | |

* cited by examiner

*Primary Examiner* — Jaweed A Abbaszadeh
*Assistant Examiner* — Keshab R Pandey
(74) *Attorney, Agent, or Firm* — Trop, Pruner & Hu, P.C.

(57) ABSTRACT

In one embodiment, a processor core has one or more execution units, a first memory array having a first protection circuit to provide soft error protection to the first memory array, and a control circuit. A power controller coupled to the core may include a protection control circuit, in response to an update to an operating voltage to be provided to the core, to cause the core to disable the first protection circuit. Other embodiments are described and claimed.

17 Claims, 18 Drawing Sheets

SYSTEM, APPARATUS AND METHOD FOR DYNAMICALLY CONTROLLING ERROR PROTECTION FEATURES OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology). Power consumption limitations may be enforced in a given system to ensure that it complies with its power requirements to operate in a given environment (and within its cooling system).

Radiation-induced soft errors, caused primarily by neutron particles, have become a problem for processor designers. Because this type of error does not reflect a permanent failure of the device, it is termed a soft or transient error. These bit upsets from transient faults are in addition to those caused by alpha particles from packaging material and bumps. As the number of transistors on a single chip increases and voltage scaling continues, such soft errors are expected to increase. To address this concern, processors often include some form of error detection and/or recovery. Nonetheless, as more transistors are added to a single chip it becomes even more challenging to maintain the same level of reliability in succeeding generations of processors.

DETAILED DESCRIPTION

Figure 1:
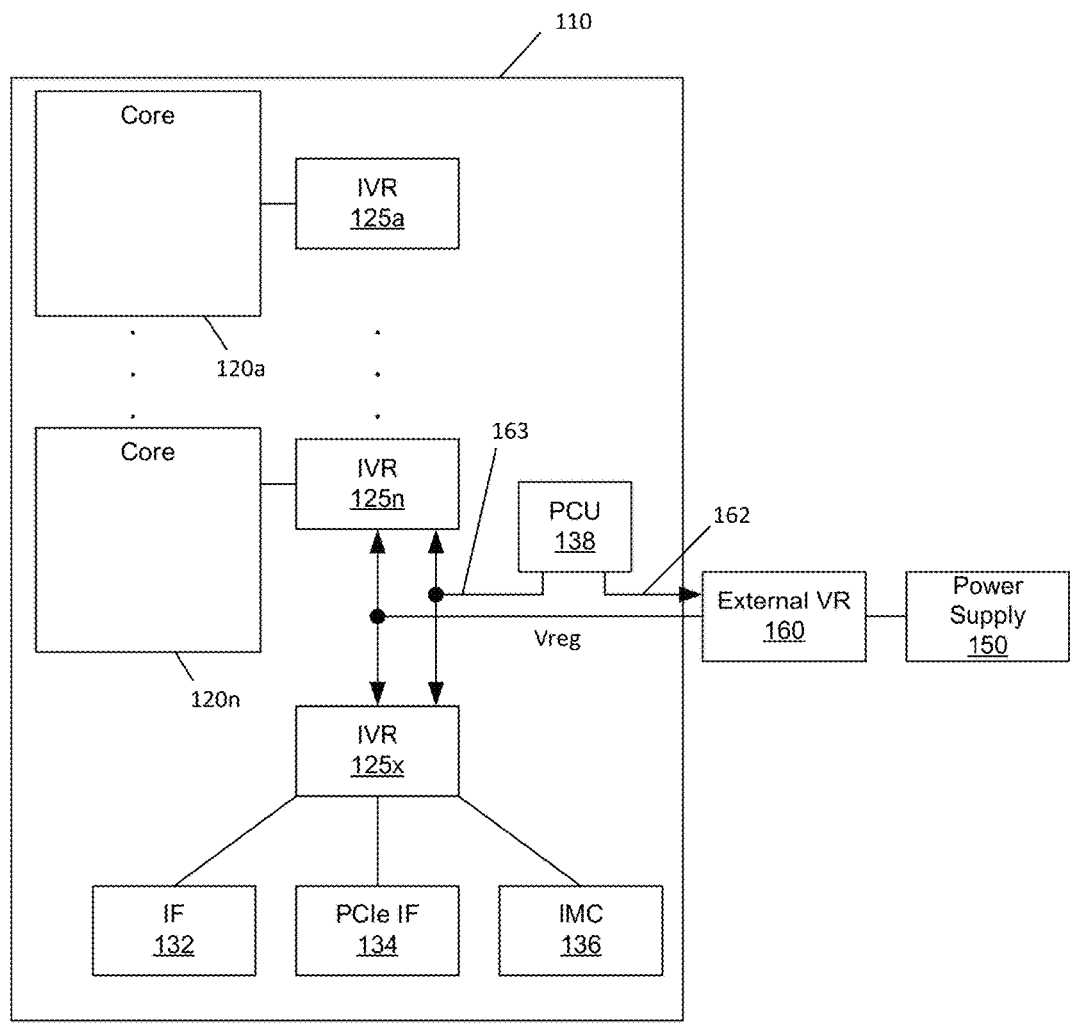
FIG. 1 is a block diagram of a portion of a system in accordance with an embodiment of the present invention.

In various embodiments, a processor may be controlled to dynamically enable and disable operation of certain soft error protection features of the processor based at least in part on an operating voltage. More specifically as described herein, embodiments can dynamically enable and disable soft error protection techniques, based at least in part on an operating voltage to be provided to circuitry associated with the soft error protection circuitry (also referred to herein as "protection features").

Specifically, when it is determined that an operating voltage exceeds a particular level, at least certain soft error protection circuitry can be disabled, since at such higher operating voltage, there is less likelihood of soft errors. By disabling such circuitry (and placing the circuitry into a low power state in which it is not provided with an operating voltage), a reduced dynamic capacitance (Cdyn) is realized, which reduces power consumption. As such, the processor can operate at higher performance states (e.g., higher operating voltage and/or operating frequency). Instead when it is determined that an operating voltage is below a particular level, such soft error protection circuitry can be enabled, to reduce the threat of soft errors.

Modern processors such as a server microprocessor can suffer from power limits. That is, power envelope requirements may prevent a processor from operating at higher frequency and/or higher voltage to achieve higher performance. At the same time, with increasing numbers of cores in a processor, it becomes more difficult to meet a given specification for soft error rate (SER), and as such a given core's SER contribution is to be reduced. Power consumption of soft error mitigation or protection features can be significant. Soft errors are defined statistically as SER (e.g., a given SER budget for a processor, such as may be specified by the processor manufacturer or required by a platform manufacturer) at an average working voltage. However often a processor is controlled to operate at higher voltages than this average working voltage level.

Embodiments may dynamically leverage this situation such that at higher operating voltages, at least certain soft error mitigation features can be disabled. Such feature(s) may be disabled in a mode having high activity when total power consumption is primarily due to active power. In contrast, in a low activity mode (close to a minimum operating voltage), most power consumption results from leakage. In particular embodiments, such features having a given ratio of power versus SER (power/SER) can be selectively disabled. For example, such features having a power/SER ratio that exceeds a particular level (e.g., a high power penalty for low SER benefit) can selectively be disabled. This is so, as SER is lower at higher voltages (e.g., approximately 10% SER reduction for an approximately 50 millivolt (mV) voltage increase). Thus a potential SER increase as a result of disabling one or more SER reduction features can be compensated (fully or partly) by operation at a higher voltage level. With this disabling, the active power reduction for the feature disabling may be enough to increase operating voltage (for the same power envelope) and to realize the SER reduction to compensate for error protection lost as a result of feature disabling. As a result of this power reduction by disabling certain error protection circuitry, an operating voltage and/or frequency may be increased, in turn leading to increased performance. In this way, a processor may maintain a given level of power consumption and SER, while realizing higher performance. In one particular example, disabling of one or more protection circuits can result in approximately 2.5-5% core Cdyn reduction, which in turn can enable an increase in a maximum operating voltage of approximately 25-50 mV, in turn leading to an increase in performance of approximately 1-3%.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth.

Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

Still referring to FIG. 1, additional components may be present within the processor including an input/output interface (IF) 132, another interface 134, and an integrated memory controller (IMC) 136. As seen, each of these components may be powered by another integrated voltage regulator $125_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). As will be described herein, PCU 138 may include circuitry to dynamically enable and/or disable error protection mechanisms within one or more cores 120 or other portions of processor 110 based at least in part on an operating voltage.

In FIG. 1, PCU 138 is illustrated as being present as a separate logic of the processor. In other cases PCU logic 138 may execute on a given one or more of cores 120. In some cases, PCU 138 may be implemented as a microcontroller (dedicated or general-purpose) or other control logic configured to execute its own dedicated power management code, sometimes referred to as P-code. In yet other embodiments, power management operations to be performed by PCU 138 may be implemented externally to a processor, such as by way of a separate power management integrated circuit (PMIC) or other component external to the processor. In yet other embodiments, power management operations to be performed by PCU 138 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
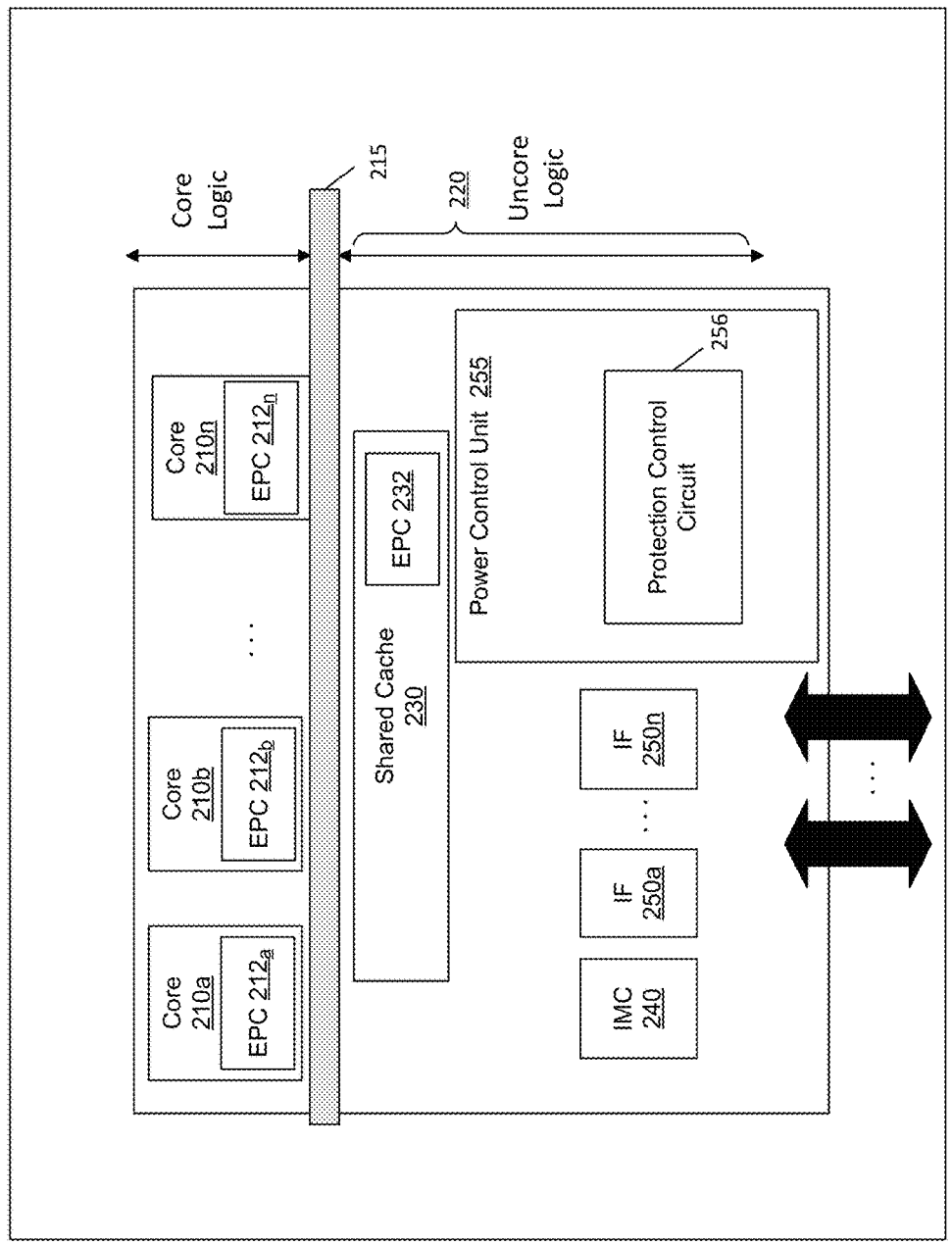
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores 210$_a$-210$_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. Cores 210 may further include error protection circuits 212a-212n. Each such error protection circuit may provide core-internal protection against soft errors. As described herein, such protection circuits can be dynamically controlled to be enabled and/or disabled. The various cores may be coupled via an interconnect 215 to a system agent or uncore 220 that includes various components. As seen, the uncore 220 may include a shared cache 230 which may be a last level cache. Shared cache 230 similarly may include an error protection circuit 232. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. As illustrated, PCU 255 may include a protection control circuit 256 that may, based at least in part on operating voltage, dynamically control the enabling and/or disabling of error protection circuits within processor 200, as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
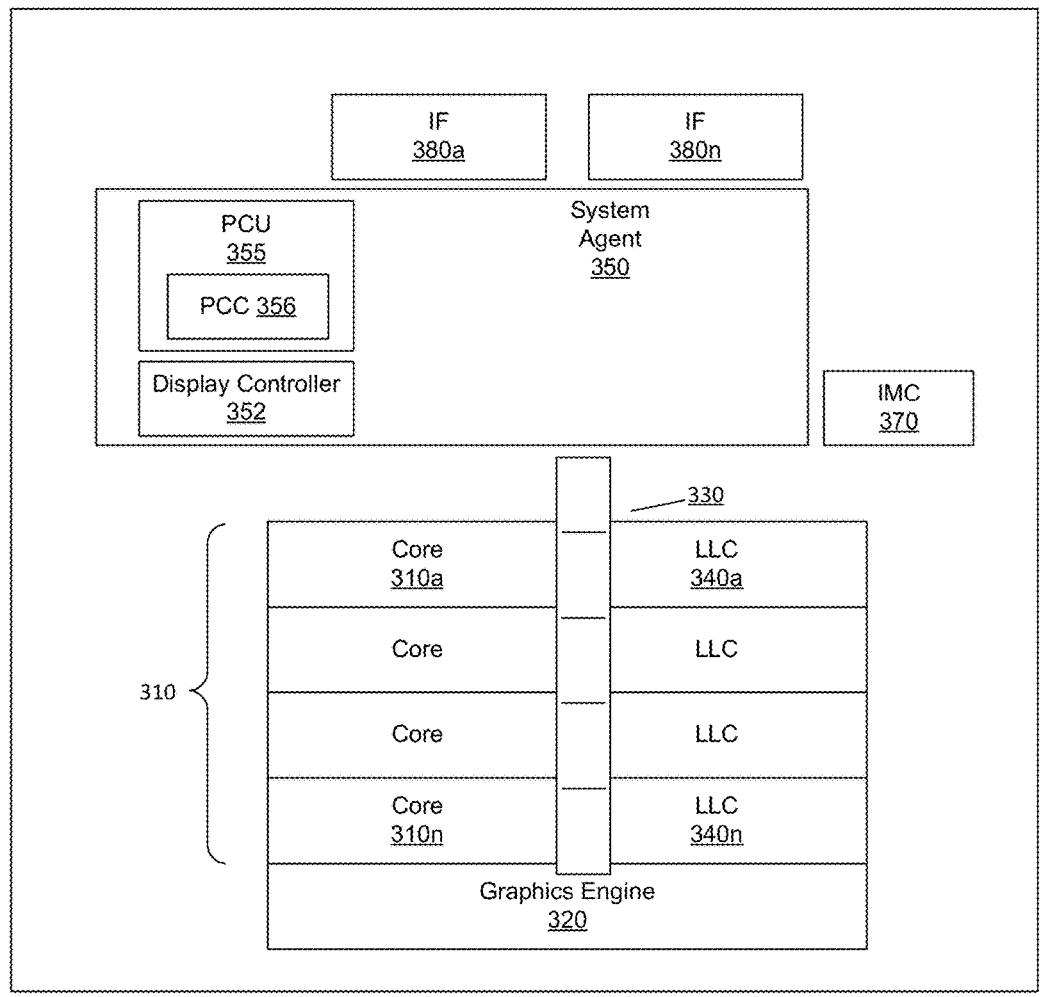
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores 310a-310n, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) 340a-340n. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. As illustrated, PCU 355 includes a protection control circuit 356 that may, based at least in part on operating voltage that exceeds a given threshold, disable one or more protection circuits within processor 300 (which may be included within individual cores 310, graphics engine 320, and/or LLC 340).

As further seen in FIG. 3, processor 300 can further include an integrated memory controller (IMC) 370 that can provide for an interface to a system memory, such as a dynamic random access memory (DRAM). Multiple interfaces 380a-380n may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
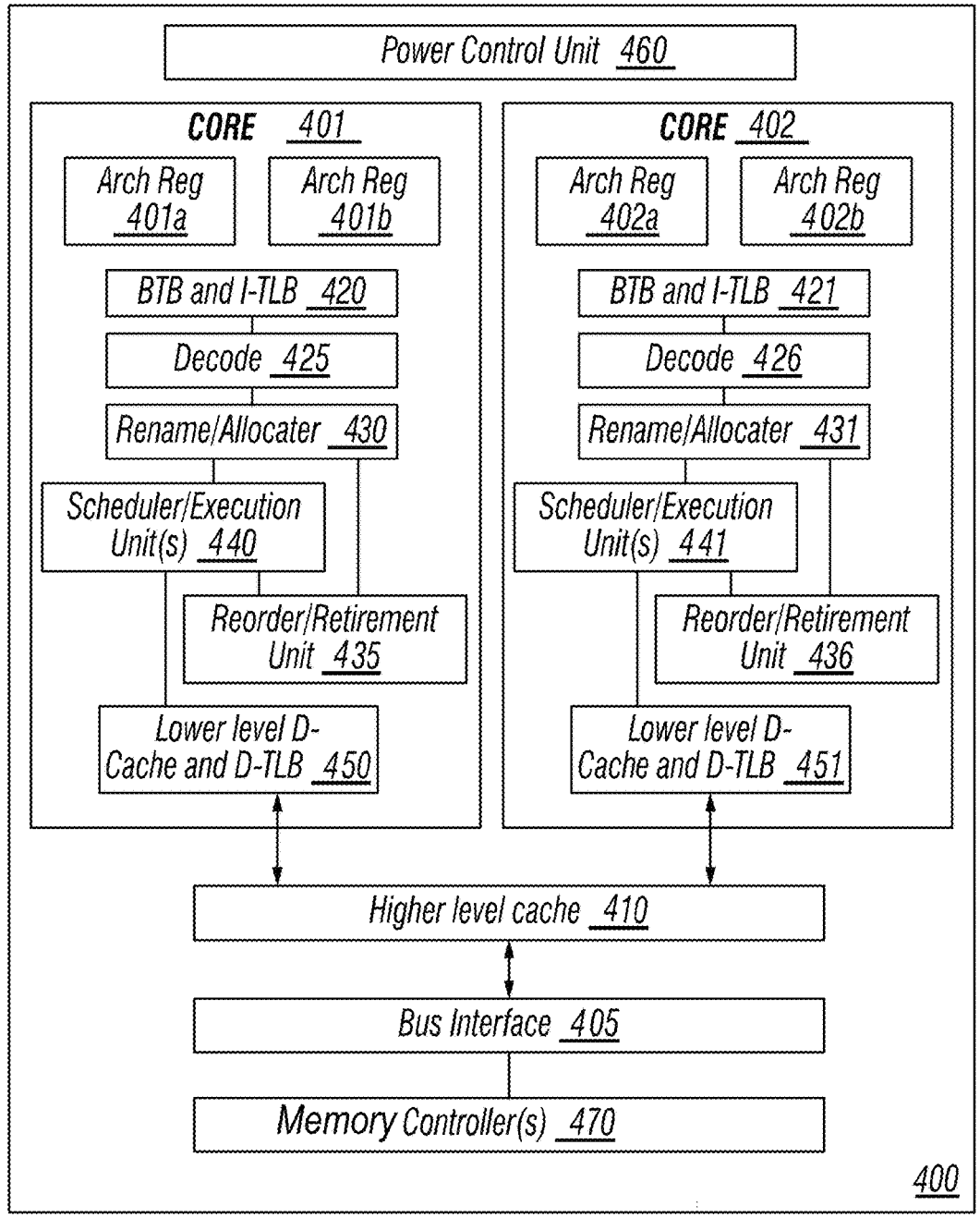
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
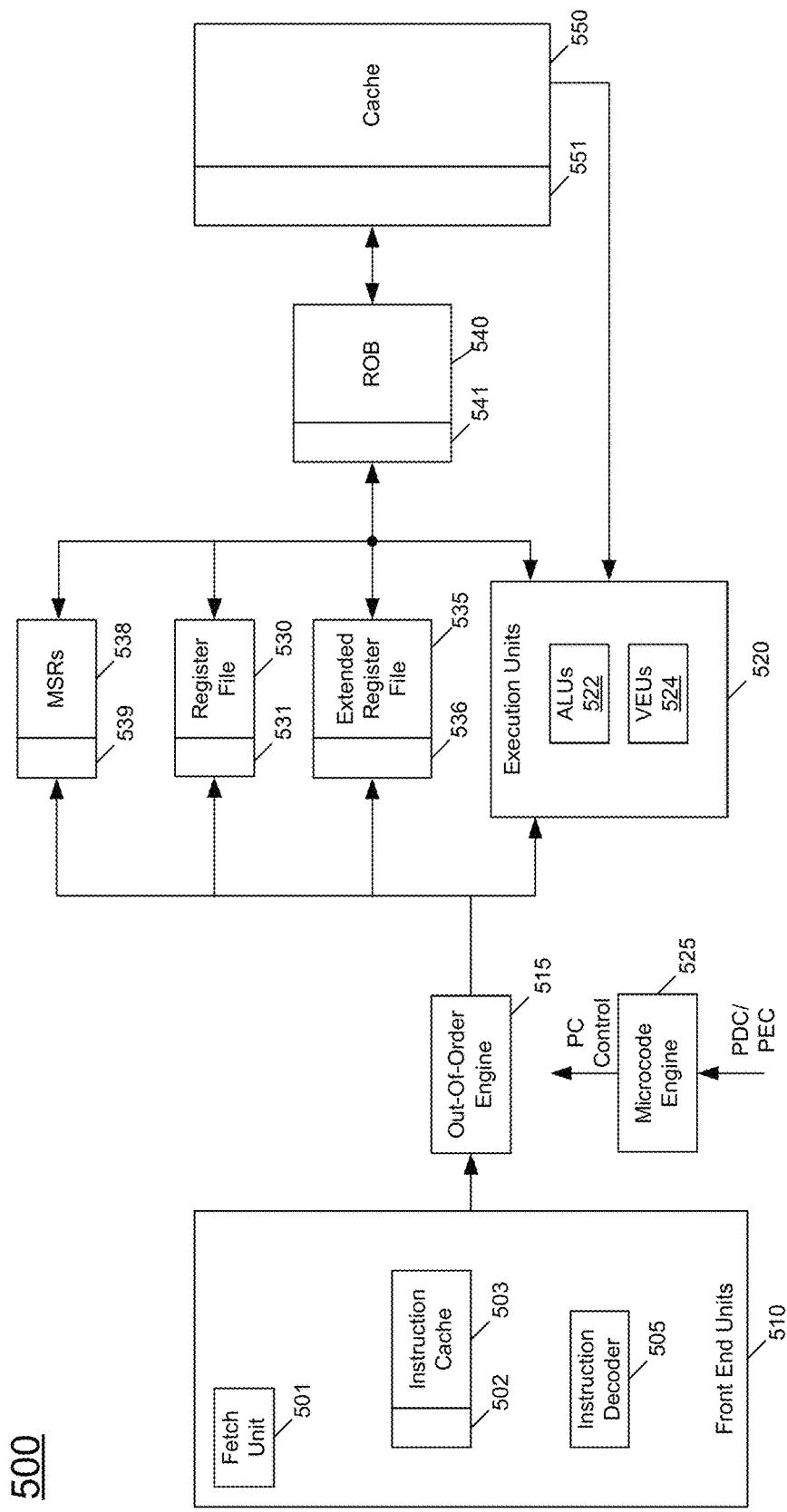
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator. With controllable voltages, embodiments may provide for dynamic control of one or more protection circuits within core 500 when an updated operating voltage exceeds or falls below one or more protection thresholds, as discussed herein.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor. As illustrated, instruction cache 503 may be associated with a protection circuit 502. In embodiments, protection circuit 502 may be implemented as additional fields or bits within entries of instruction cache 503 to enable storage of information such as parity/error correction coding (ECC) information, along with control circuitry to utilize such information when writing to and reading from entries of cache 503.

A microcode engine 525 may include a microcode storage and control circuitry to execute such microcode. Relevant to embodiments herein, microcode engine 525 may receive protection enable commands (PECs) and protection disable commands (PDCs), e.g., from a power controller such as a PCU and send protection circuit (PC) control signals to corresponding protection circuits such as protection circuit 502 to dynamically enable and disable such circuits as described herein.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535, both of which may be associated with corresponding protection circuits 531 and 536, e.g., implemented as additional bits or indicators for entries within the register files to indicate protection status and protection information, such as parity/ECC information. Register file 530 may include separate register files for integer and floating point operations. For purposes of configuration, control, and additional operations, a set of machine specific registers (MSRs) 538 may also be present and accessible to various logic within core 500 (and external to the core). MSRs 538 may be associated with a corresponding protection circuit 539.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units. In some cases, these units also may be associated with error protection circuitry.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement. As illustrated, ROB 540 may be associated with a protection circuit 541.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. As seen, cache 550 may be associated with a corresponding protection circuit 551 which, as with the other protection circuits, may be implemented with control circuitry and corresponding fields or indicators for, e.g., parity/ECC information and protection validity information. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
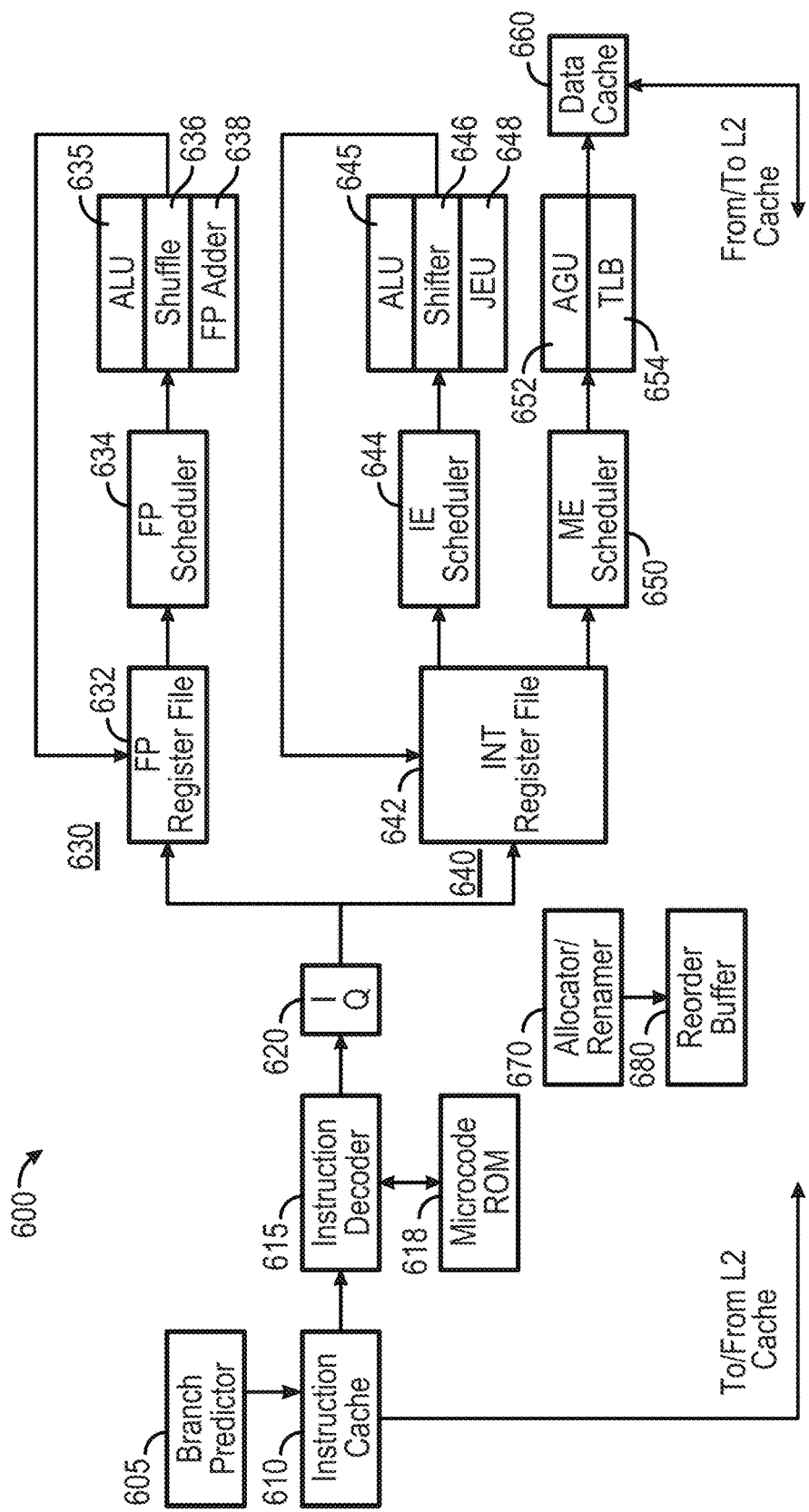
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit width such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit width such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
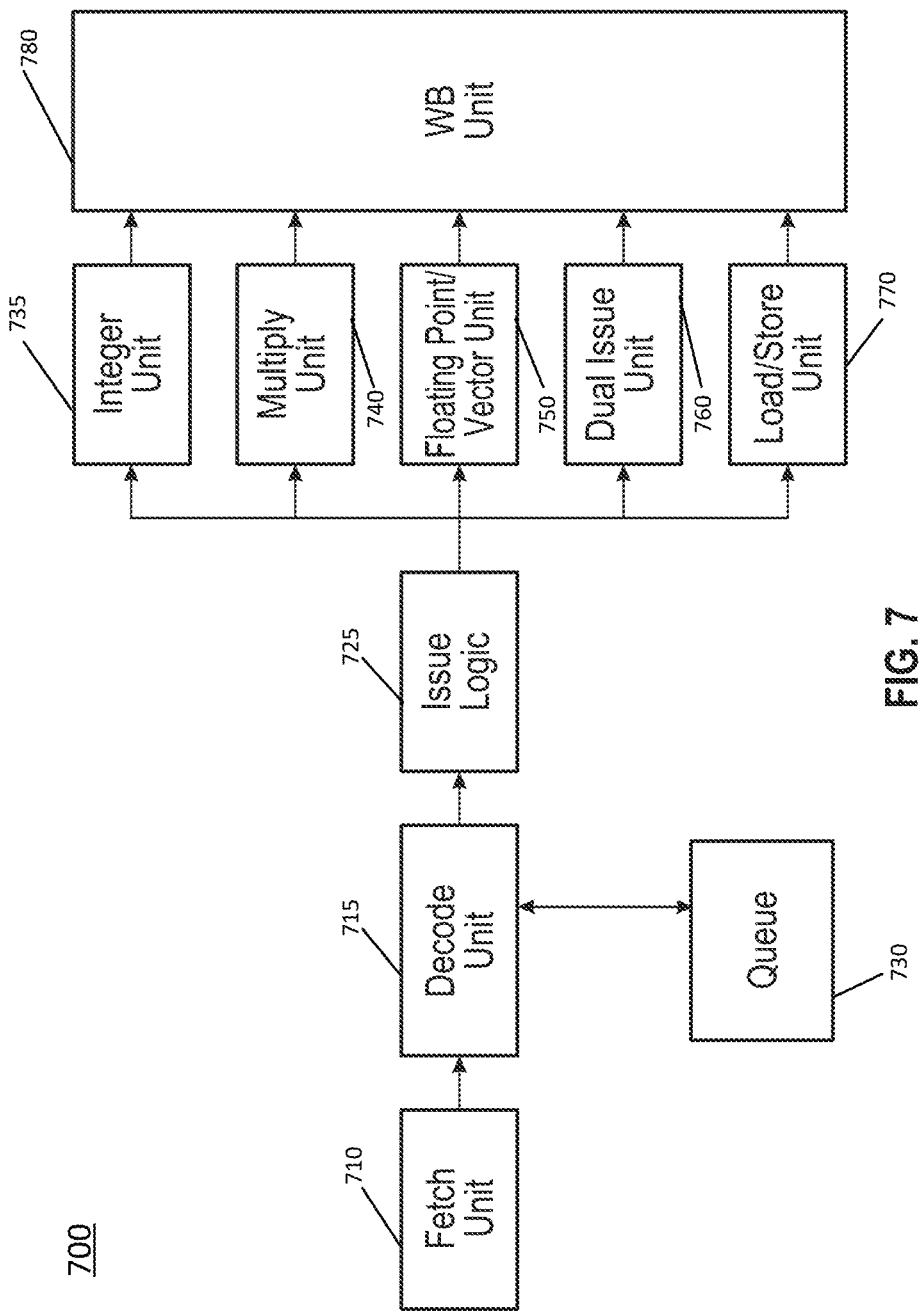
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
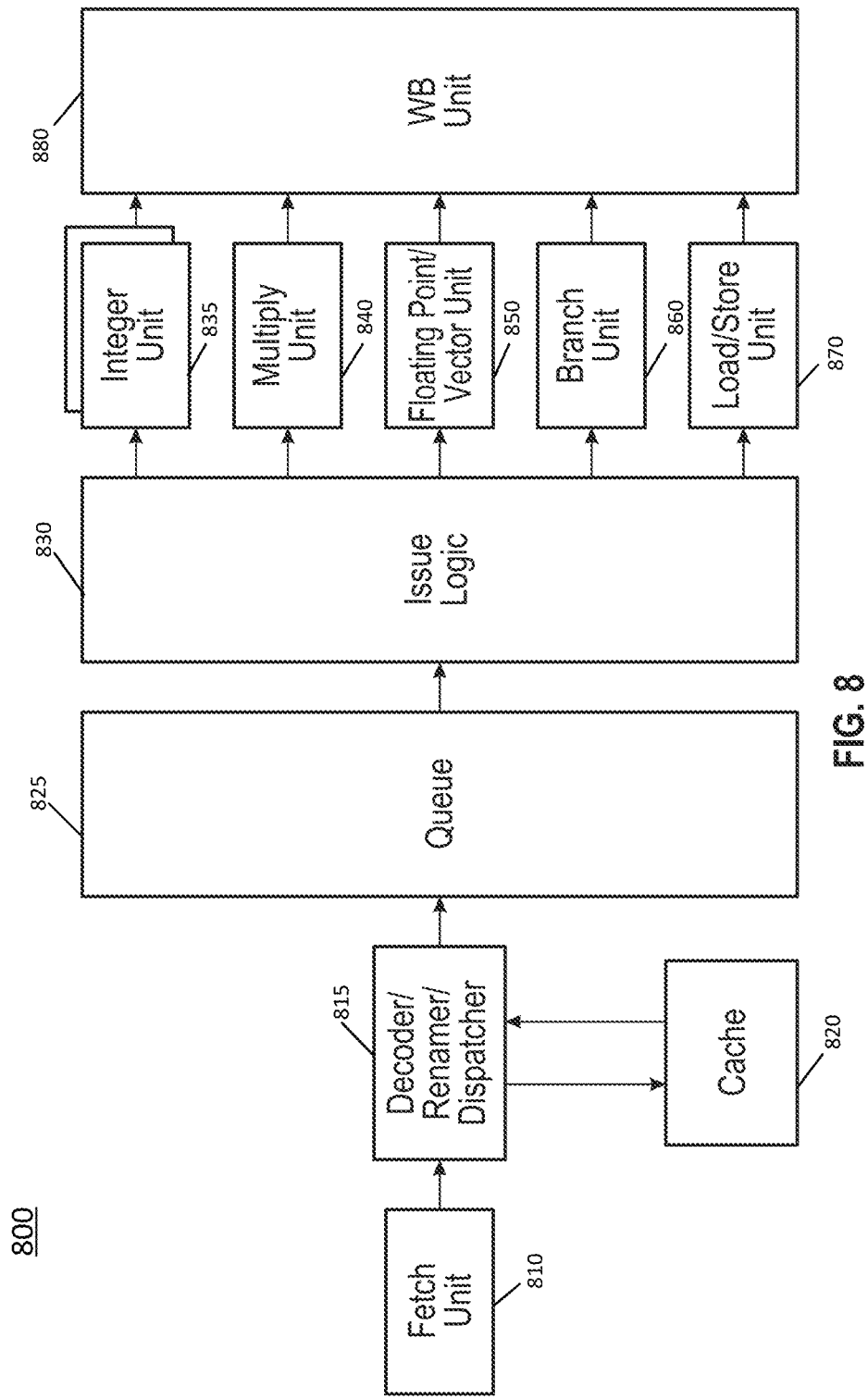
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
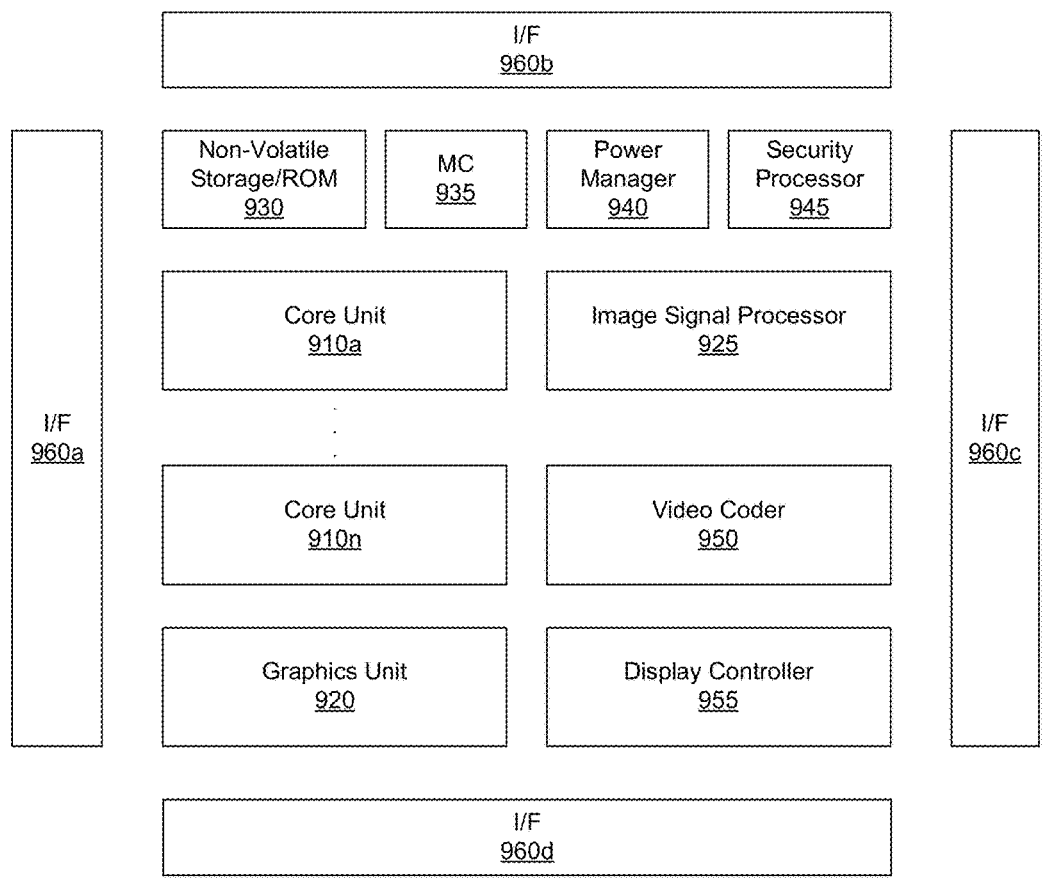
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910a-910n. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
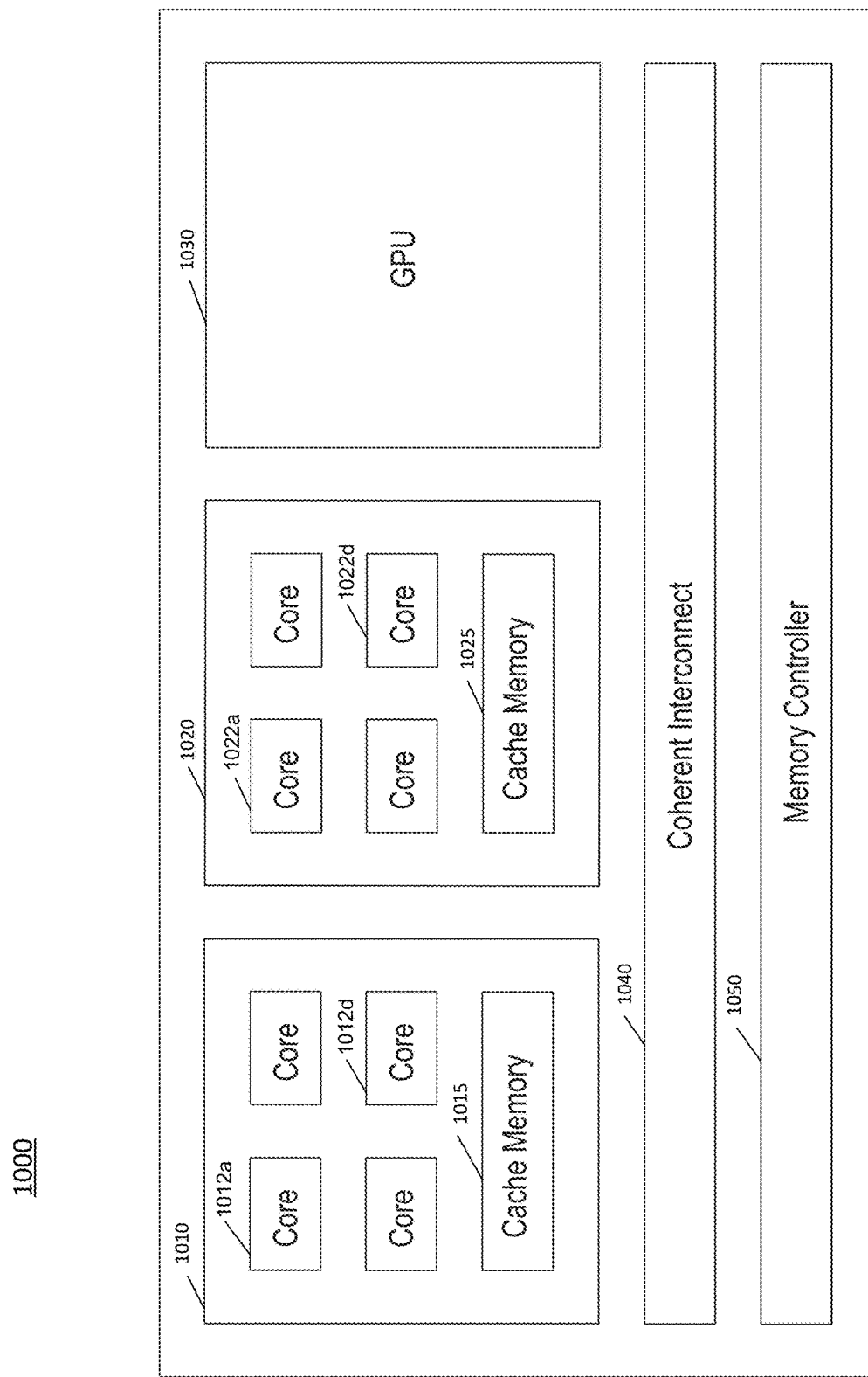
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012a-1012d. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022a-1022d. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
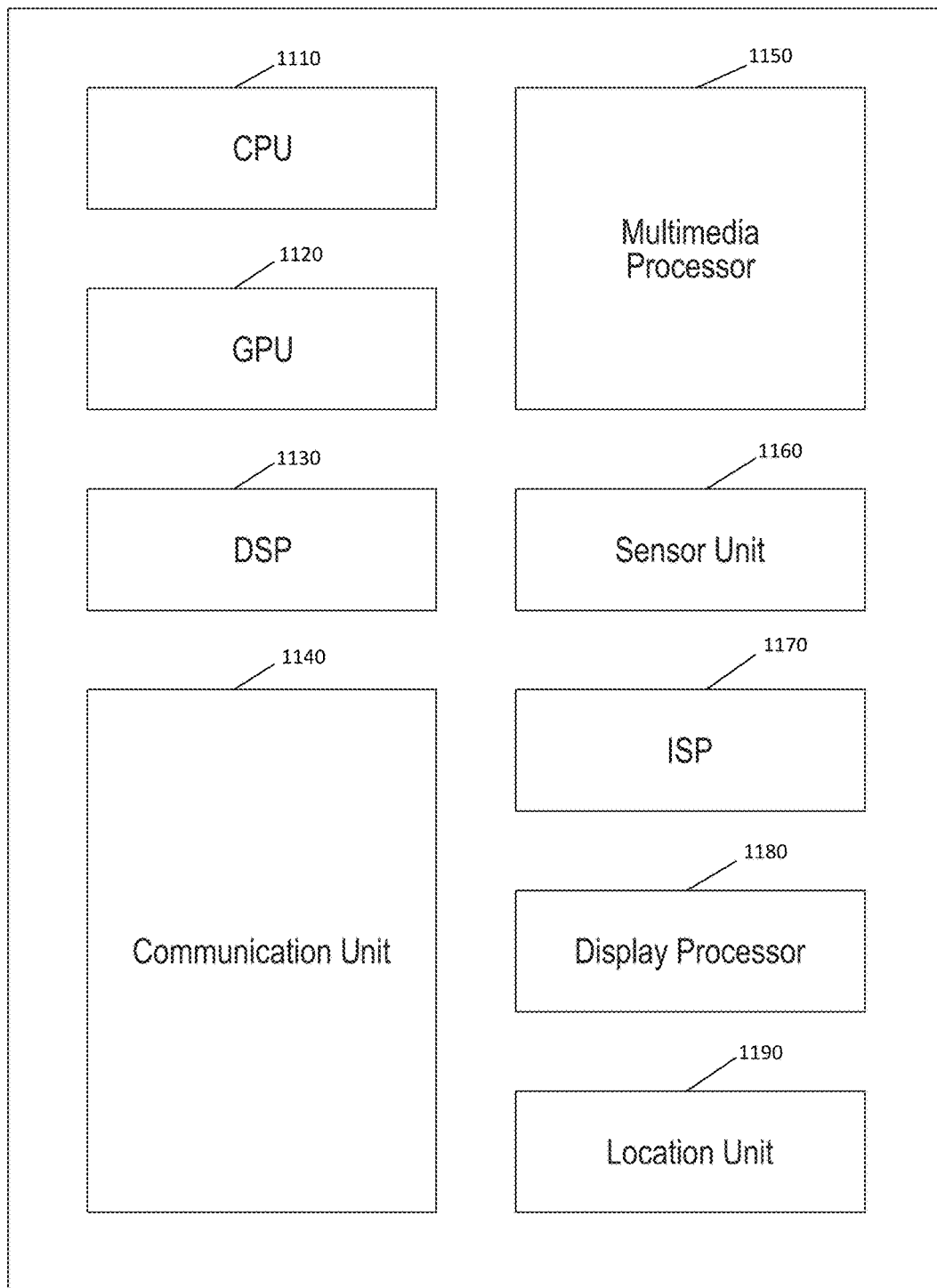
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
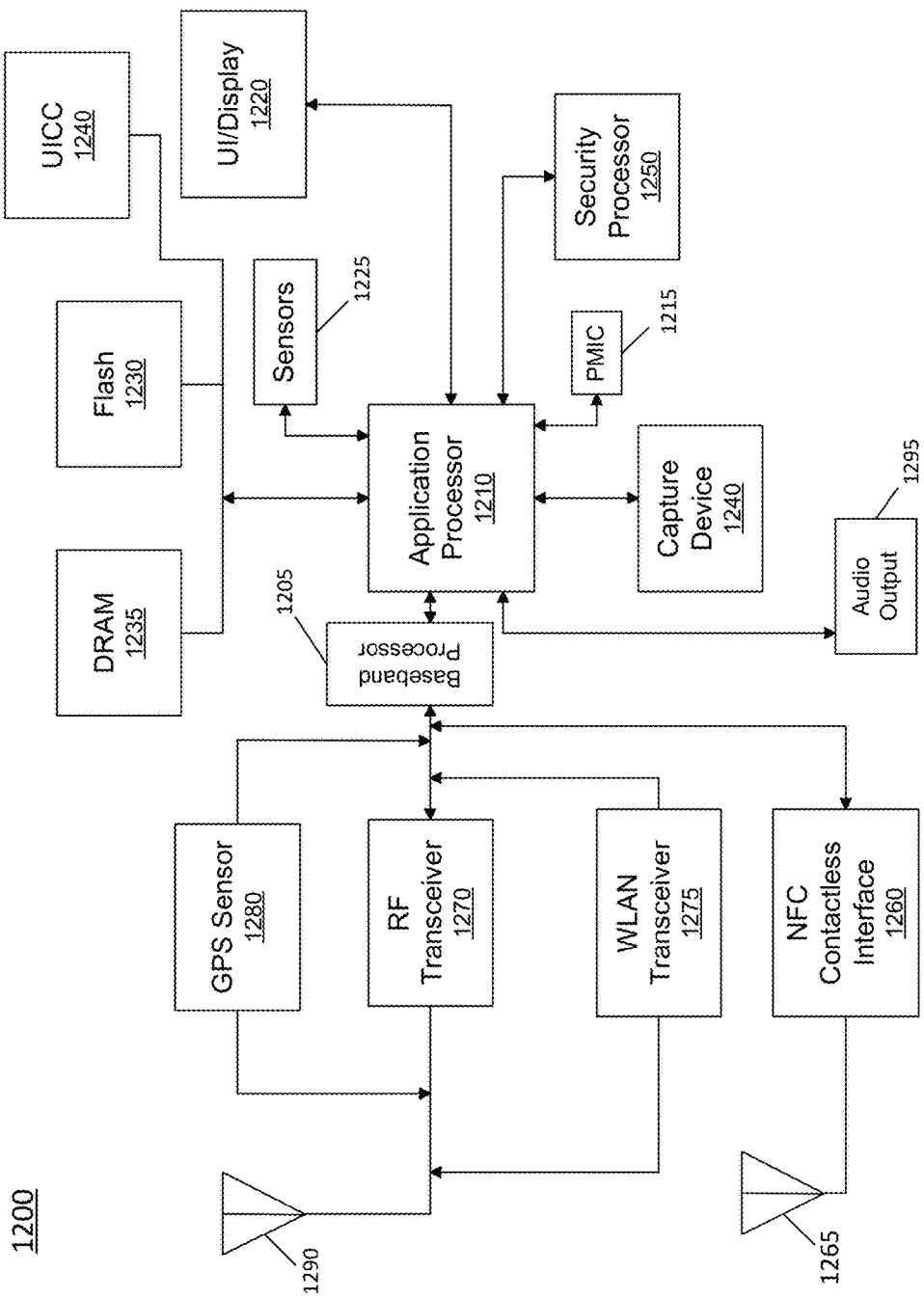
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
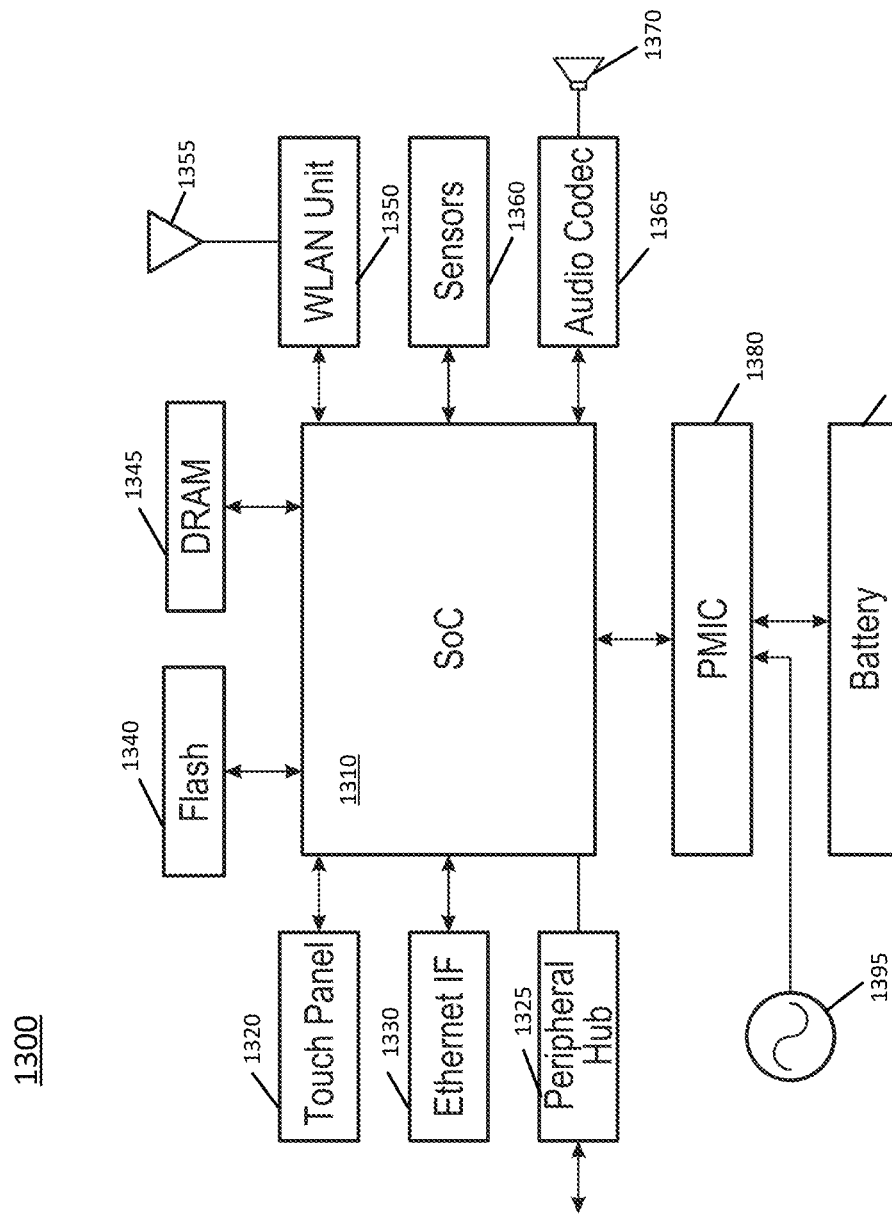
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
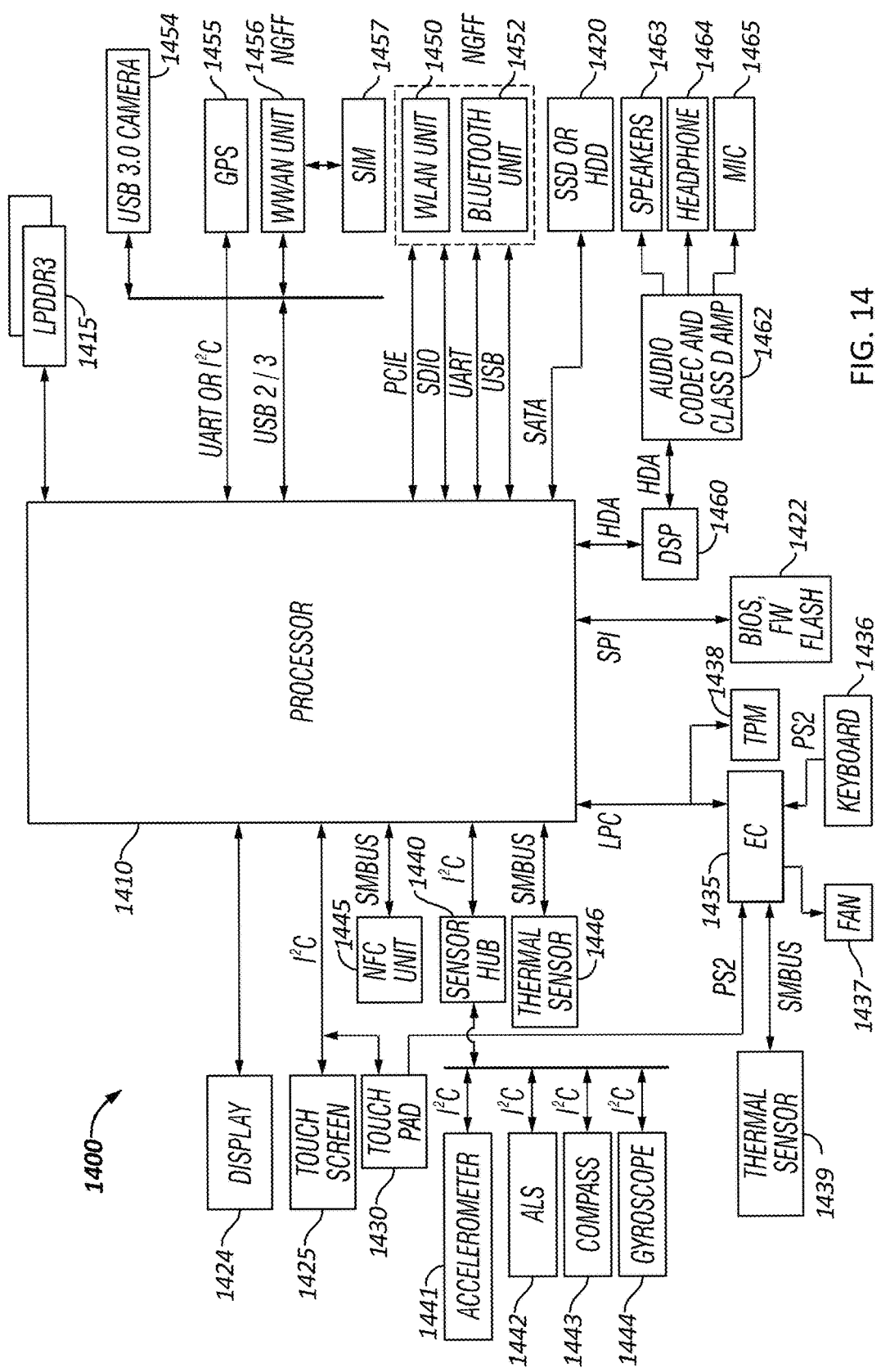
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array micro-phones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
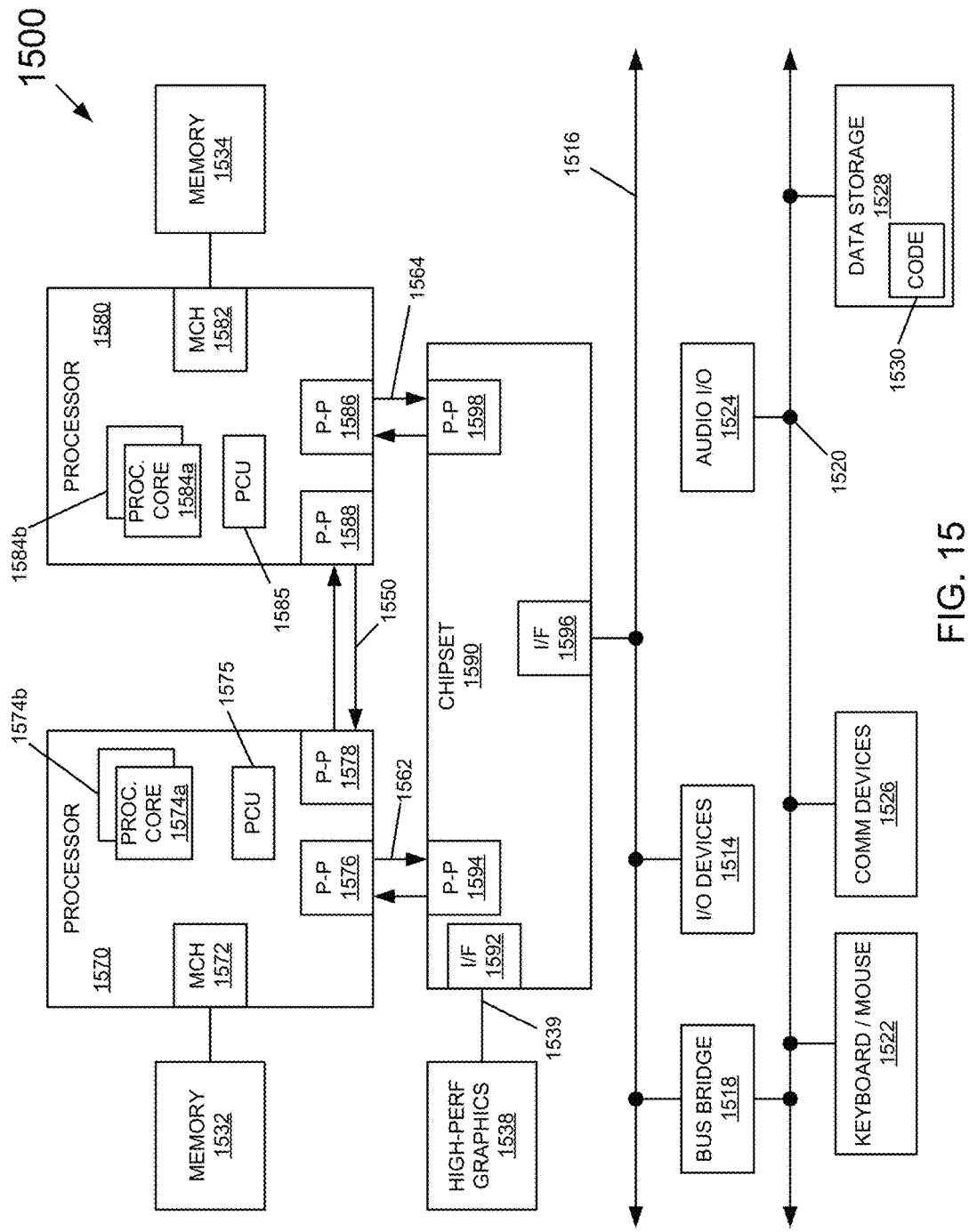
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU (1575, 1585) or other power management logic to perform processor-based power management as described herein. In embodiments, the PCU can include circuitry to dynamically control error protection circuitry within corresponding processors 1570, 1580 based at least in part on operating voltage to enable operation to be maintained within a given SER budget, while at the same time achieving power reduction and performance benefits.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
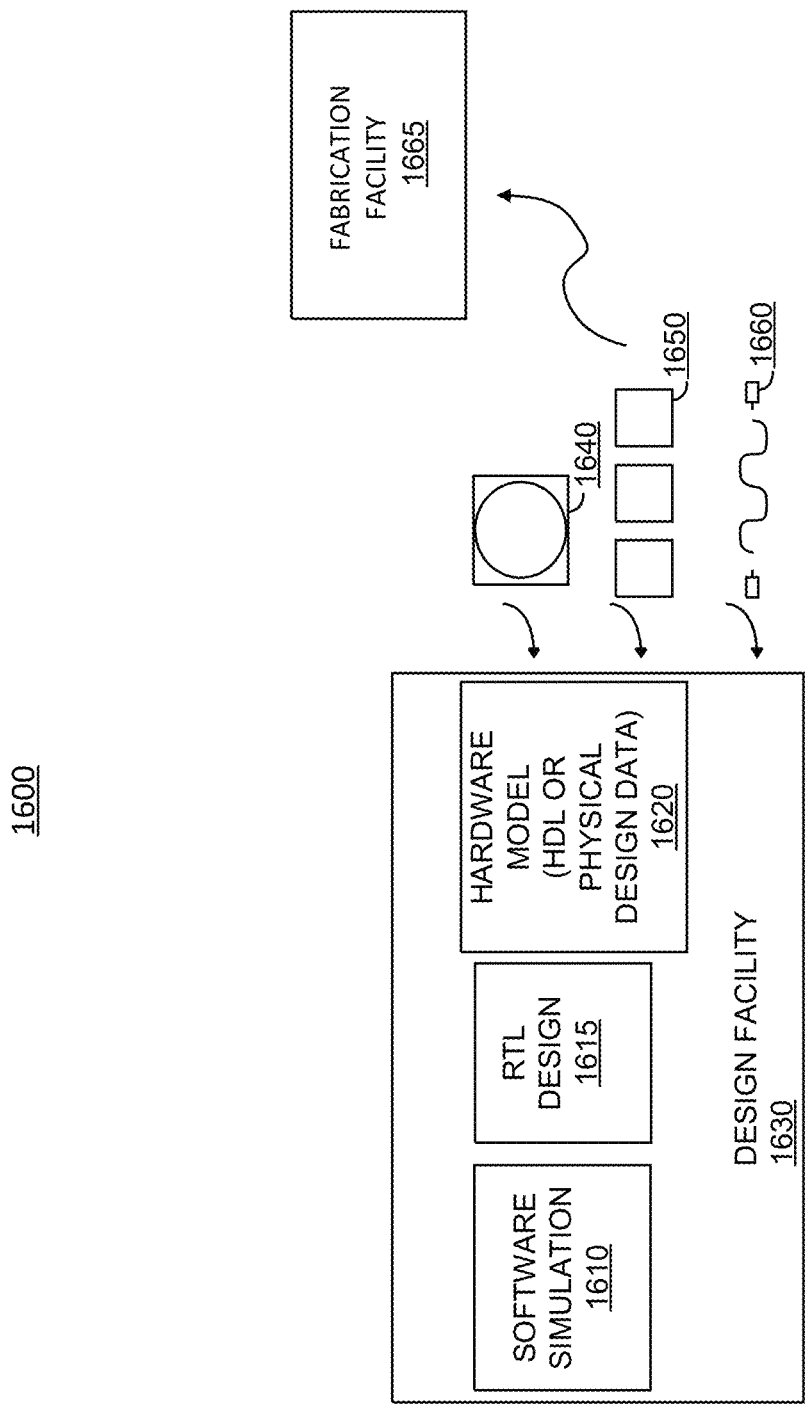
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
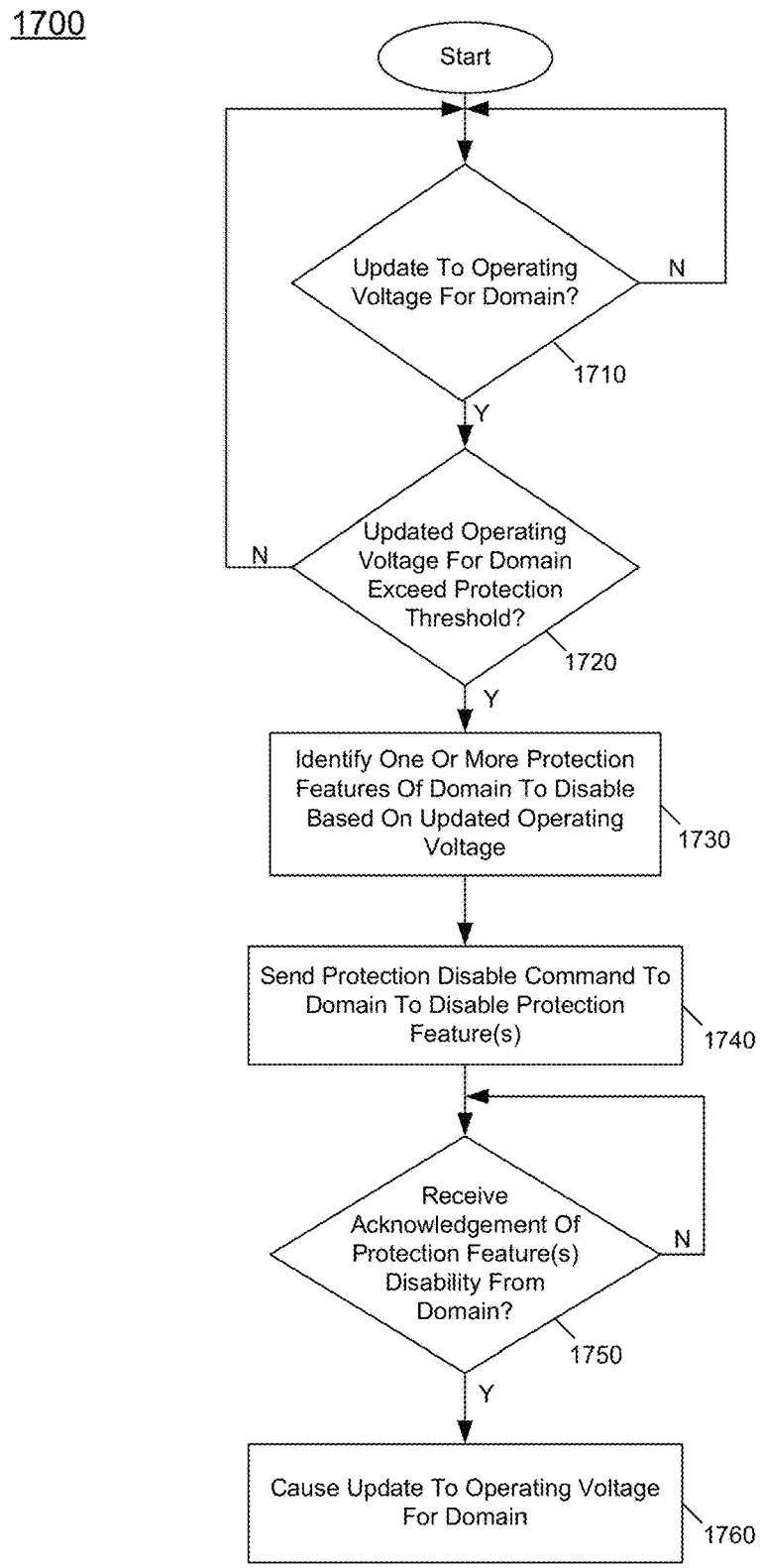
FIG. 17 is a flow diagram of a method in accordance with an embodiment of the present invention.

Referring now to FIG. 17, shown is a flow diagram of a method in accordance with an embodiment of the present invention. As illustrated in FIG. 17, method 1700 is a method for dynamically controlling deactivation of error protection features in accordance with an embodiment. Method 1700 may be performed by hardware circuitry, software, firmware and/or combinations thereof. In one particular embodiment, method 1700 may be performed by an error protection control circuit of a PCU or other power controller along with corresponding core circuitry such as a microcode engine.

As illustrated, method 1700 begins by determining whether there is an update to an operating voltage for a given domain (diamond 1710). This update may be responsive to a determination of a voltage increase or decrease for a given domain. The domain may be a power domain that includes one or more cores or other processing engines that operate at a common performance state (e.g., operating voltage and operating frequency point). Note that this determination at diamond 1710 is a determination of an indication of a requested update to the voltage and not the actual voltage update itself. In some cases, this determination may be based on further power controller operation that identifies that a voltage update is warranted. Such voltage update may occur responsive to a request (e.g., from an OS, firmware or a core entity itself). In other cases, a determination that a voltage change is warranted may be due to, e.g., a given processor constraint such as a power constraint, thermal constraint or so forth.

In any event, if it is determined at diamond 1710 that an update to an operating voltage is indicated, control passes to diamond 1720 to determine whether the updated voltage for the domain exceeds a given protection threshold. Note that in some cases there may be multiple protection thresholds, where one or more protection features may be associated with each protection threshold. As such, when a given threshold is crossed, the corresponding protection feature(s) may be selectively enabled/disabled.

In this example of FIG. 17, assume that the update to the voltage is for a voltage increase such that at diamond 1720 it is determined whether this updated voltage would exceed one or more of these protection thresholds. For ease of illustration, assume a single protection threshold that is associated with one or more protection features of a processor. If the determination at diamond 1720 is in the affirmative, control passes to block 1730 where one or more protection features of the domain may be identified for disabling. More specifically, a configuration register or other storage may store information regarding the type of protection features available within, e.g., a core and a given threshold above which such features may be disabled. Although the scope of the present invention is not limited in this regard, in some embodiments protection circuitry that may be dynamically controlled to be disabled/enabled may include memory array ECC and/or parity protection, data path residue checking circuitry, among others. Other examples may include features based on redundant structures like lockstep or systems with a number of structures that generate a decision according to a majority vote. For purposes of illustration, assume that at block 1730 a single protection feature, such as parity or ECC coding for a memory array of the processor, is identified.

Next at block 1740 a protection disable command is sent to the domain to instruct the domain to disable this protection feature or features. Continuing with the above example, the protection disable command provides information to indicate to the domain that the ECC feature for one or more memory arrays is to be disabled.

Still with reference to FIG. 17, it is next determined at diamond 1750 whether an acknowledgement of this protection feature disability has been received from the domain. That is, when the domain receives a disable command and successfully disables the given feature, it sends an acknowledgement signal back to the power controller. This is so, as the power controller does not cause the voltage update to occur until this acknowledgement signal is received. Thus as illustrated, when it is determined at diamond 1750 that this acknowledgement is received, control passes to block 1760 where the operating voltage for the domain is caused to be updated. For example, the power controller may send a voltage update signal to a voltage regulator associated with the domain to cause the voltage regulator to update the voltage accordingly.

Understand while shown at this high level in the embodiment of FIG. 17, many variations and alternatives are possible. For example, while FIG. 17 illustrates a situation in which the update is for an increased voltage, a similar flow may occur for dynamic voltage decrease situations. In such cases, at diamond 1720 the determination instead would be as to whether the updated operating voltage falls below a given protection threshold. Assuming that is the case, the flow proceeds as shown, with the exception that the command to the domain is to cause one or more protection features to be enabled (from a disabled state). And similarly, the actual update of the voltage to a voltage level does not occur until an acknowledgement is received that the domain has in fact caused such one or more protection features to be enabled.

Figure 18:
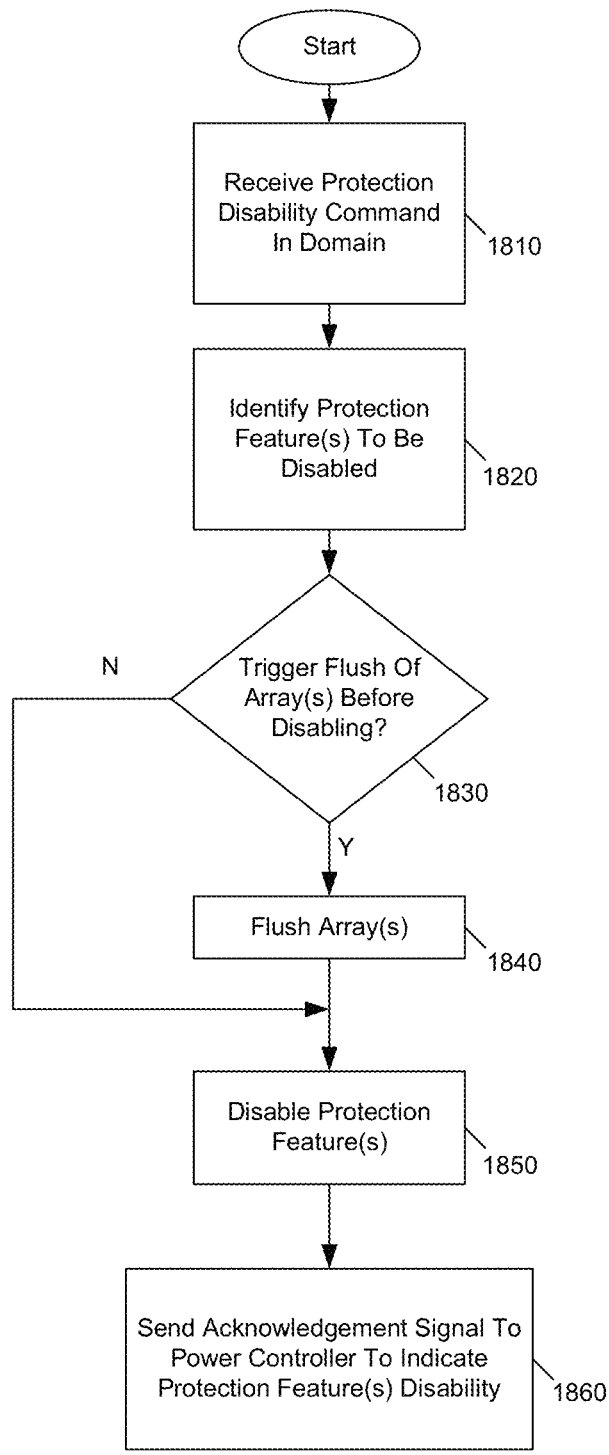
FIG. 18 is a flow diagram of a method in accordance with another embodiment of the present invention.

Referring now to FIG. 18, shown is a flow diagram of a method in accordance with another embodiment of the present invention. More specifically, FIG. 18 illustrates a method 1800, which may be performed by domain-internal circuitry to control protection features dynamically as described herein. Method 1800 may be performed by hardware circuitry, software, firmware and/or combinations thereof. In one particular embodiment, method 1800 may be performed by a microcode engine or other control engine of a core, which executes microcode or other instructions to dynamically enable and/or disable one or more protection circuits of the core in response to protection enable/disable commands received from a PCU or other power controller.

As illustrated, method 1800 begins by receiving a protection disability command in the domain (block 1810). As discussed above, this protection disability command may be sent from a power controller responsive to a determination of an update to an operating voltage that exceeds a given protection threshold. For purposes of discussion herein, assume that the command includes information regarding one or more protection features to be disabled. Control next passes to block 1820 where the protection feature or features to be disabled are identified. This identification may be based on information associated with the command. In a particular embodiment, microcode circuitry of a core may receive this command from a power management agent (PMA) of the domain (which may be present in a core perimeter logic associated with a given core), itself in communication with a PCU or other power controller In any event, responsive to the identification at block 1820 of the particular protection feature(s) to be disabled, microcode or other circuitry of the core can determine whether certain preparatory actions are needed before disabling the protection feature. More specifically as illustrated in FIG. 18, at diamond 1830 it is determined whether a flush of one or more arrays are to be triggered before the disabling. Such control of flush activities may be based upon, e.g., BIOS control to indicate whether a core is to flush arrays before disabling at least certain protection features. Or this determination may be based on application-specific criteria to indicate whether such flushing is needed or not.

This is the case, as in some cases at least certain arrays protected by a given protection technique may be flushed to improve SER reliability. In different environments, various manners of dynamically controlling error protection circuitry can occur. In some cases such circuitry may be entirely disabled, while in other cases certain operations of the circuitry can be dynamically controlled to be disabled. For a memory array (e.g., an internal cache memory), one manner of dynamic control may be to stop any read/write activities with regard to parity/ECC bits. In this way, power consumption is avoided for parity/ECC generation for write, read and write cycles, and parity/ECC checking including needed calculations. In some instances, the memory array may be flushed prior to this dynamic control to disable the protection, to maintain an acceptable SER level by avoiding a situation in which an array data corruption at low voltage will not be detected when reading at high voltage. Without this flush operation, it is possible that silent data corruption (SDC) faults can increase, which may be taken into account for a total SER budget. In some embodiments, an array flush may also be performed before enabling the soft error protection circuitry to guarantee ability for the full array to leverage the SER reduction feature at low voltages. Still further an array parity/ECC check correctness signal may be forced.

In another example for a memory array, dynamic control may be to stop any read activities with regard to parity/ECC bits. In this way, power consumption is avoided for parity/ECC bit read cycles and parity/ECC checking, including needed calculations. In some instances, the memory array may be flushed prior to this dynamic control to disable such protection to maintain an acceptable SER level, thus avoiding a situation in which an array data corruption at low voltage will not be detected in reading at high voltage.

As yet another example, a protection circuit may be controlled to force a constant level of data and parity/ECC bits to be read from a memory array for read data parity status calculation, to avoid signal toggling in all parity/ECC circuits. Similar to the above discussion, this technique may save parity/ECC circuit power consumption at higher voltages.

In yet other cases, read/write activities for memory array parity/ECC bits may be disabled, reducing power consumption of parity/ECC bit generation for write, read and write cycles, parity/ECC check including needed calculations. At the same time, no array flush is performed. To maintain validity and coherency, the memory array may include a protection validity indicator (e.g., a bit) to indicate if protection information associated with a given entry is valid. In this way, for an entry (e.g., a cache line) written at the time when protection is disabled, this bit is reset (e.g., to a logic zero value) to indicate an invalid status of parity/ECC bits for the line. Parity/ECC correctness of such lines will be checked at a read cycle after enabling of parity/ECC protection. As such, this protection validity indication may be used to define valid status for array lines written with parity/ECC bits.

In an embodiment, a data path residue check disable is similar to the techniques described above, and note there is no need to take into account possible silent data corruption degradation. Also note that a check correctness signal may be forced in this case.

As yet another example, a protection circuit associated with an instruction decoder queue can be dynamically enabled/disabled. Such control may occur without any flush activity as this array is periodically flushed during normal operation (e.g., every 250-500 clock cycles). As such a protection circuit of this queue (e.g., parity bit calculation for write and status check at read) may be disabled after a first flush at a high voltage (i.e., above a given threshold) and enabled after a first flush at a low voltage (i.e., below a given threshold). Thus a natural system flush of certain arrays can be used to synchronize disabling of error protection features.

Also in an example embodiment (such as shown in FIG. 5 above), physical register files (PRFs) may have a protection circuit such as a parity generator to store a parity bit per entry. Such PRFs can have dynamic error protection circuit control (enable/disable) by providing protection validity indicators (e.g., a bit) per register file entry. This bit will identify whether the entry's parity bit is valid. At a low voltage (below a threshold), PRF parity protection is enabled and all data written at this time will store a correct parity bit and a valid protection indicator. At a high voltage (above a threshold), PRF parity protection is disabled. No parity bit is calculated for writes and parity bit correctness is not checked at read. For entries written during this time, the protection validity indicator is written to an invalid state.

If data written at high voltage (with no parity calculation) is read at low voltage, the protection validity indicator (in "invalid" state) will disable a parity check correctness of this entry.

Still with reference to FIG. 18, if it is determined at diamond 1830 that a flush of arrays is to be triggered before the disabling, control passes to block 1840 where the identified array or arrays may be flushed. During such flush activities, dirty data may be written to higher cache levels and all data within the given array can be cleared or otherwise invalidated. Thereafter at block 1850 the given protection feature(s) may be disabled. For example, continuing with the ECC illustration, ECC bits associated with the given array may not be set when data is written into the array and similarly may not be read or otherwise analyzed when data is read from the array. In some embodiments, array entries may include an additional protection validity indicator or bit to indicate whether the corresponding ECC information of the entry is valid or not (namely whether the array entry was written when ECC protection was enabled).

Still referring to FIG. 18, control next passes to block 1860 where the domain can send an acknowledgement signal to the power controller. As discussed above this acknowledgment signal thus indicates that the protection feature has been disabled. And responsive to receipt of this acknowledgement signal in the power controller, a given operating voltage update may occur. Understand while shown at this high level in the embodiment of FIG. 18, embodiments are not so limited. For example, a similar flow may occur for situations in which a received command is to enable a given protection feature. In such case this command (which may be received within a power management agent (PMA) of a core perimeter logic and provided to microcode circuitry), may cause the given feature to be enabled. Note that in certain cases of enabling, a flush or other preparatory actions need not be performed. After the given one or more protection features are enabled in such instances, an acknowledgement signal can be sent to the power controller to indicate that such protection feature is enabled (so that the power controller can update the voltage accordingly (e.g., to reduce the operating voltage)).

The following examples pertain to further embodiments.

In one example, a processor comprises a core including one or more execution units, a first memory array having a first protection circuit to provide soft error protection to the first memory array, and a control circuit. The processor may further include a power controller including a protection control circuit, in response to an update to an operating voltage to be provided to the core, to cause the core to disable the first protection circuit.

In an example, the protection control circuit is to send a disable signal to the core to cause the core to disable the first protection circuit.

In an example, the protection control circuit is to send the disable signal in response to a determination that the update to the operating voltage exceeds a first protection threshold.

In an example, the protection control circuit is, in response to a determination that the update to the operating voltage exceeds a second protection threshold, to cause the core to disable a plurality of protection circuits.

In an example, the control circuit is to send an acknowledgement to the power controller to indicate that the first protection circuit has been disabled.

In an example, the power controller is to cause the update to the operating voltage to be provided to the first core in response to receipt of the acknowledgement.

In an example, in response to a determination that a second update to the operating voltage is less than the first protection threshold, the protection control circuit is to cause the core to enable the first protection circuit.

In an example, the control circuit is to flush the first memory array before the first protection circuit is disabled.

In an example, after the first protection circuit is disabled, the first memory array is to write data into a first entry of the first memory array and reset a protection validity indicator associated with the first entry to indicate that the data stored in the first entry is not protected.

In an example, after the first protection circuit is disabled, the first memory array is to read data stored in a second entry of the first memory array without analysis of information stored in a protection field associated with the second entry.

In an example, the first protection circuit is to provide at least one of parity protection and error correction coding protection to the first memory array.

In an example, the power controller is to reduce a dynamic capacitance of the processor when the first protection circuit is disabled.

In another example, a method comprises: determining whether an updated operating voltage at which a domain of a processor is to operate exceeds a first protection threshold, the domain including at least one core; in response to determining that the updated operating voltage exceeds the first protection threshold, identifying at least one protection circuit of the domain to disable; sending a protection disable command to the domain to cause the at least one protection circuit to be disabled; and thereafter causing an update to the operating voltage to the updated operating voltage.

In an example, the method further comprises causing the update to the operating voltage after receiving an acknowledgement of the protection disable command from the domain.

In an example, the method further comprises: determining whether the updated operating voltage at which the domain is to operate exceeds a second protection threshold, the second protection threshold greater than the first protection threshold; and in response to determining that the updated operating voltage exceeds the second protection threshold, identifying a plurality of protection circuits of the domain to disable.

In an example, the method further comprises in response to determining that a second updated operating voltage at which the domain is to operate is less than the first protection threshold, sending a protection enable command to the domain to cause the domain to re-enable the at least one protection circuit.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having a plurality of cores, where a first core includes one or more execution units, a first storage having a first protection circuit to provide error protection to the first storage, and a control engine to dynamically disable the first protection circuit when an operating voltage of the first core exceeds a first threshold, where after the dynamic disable, the control engine is to dynamically enable the first protection circuit when the operating voltage of the first core is less than the first threshold; a voltage regulator to provide one or more operating voltages to the processor; and a system memory coupled to the processor.

In an example, the processor further comprises a power controller, in response to a determination to update the operating voltage of the first core to a level that exceeds the first threshold, to send a disable command to the processor to cause the control engine to disable the first protection circuit.

In an example, in a first mode of operation, the control engine is to flush the first storage prior to the dynamic disable of the first protection circuit, and in a second mode of operation, the control engine is to maintain contents of the first storage and dynamically disable the first protection circuit.

In an example, responsive to a read operation to the first storage, the first core is to read data and perform a parity check based on parity information associated with the data when the first protection circuit is enabled, and read the data and not perform the parity check when the first protection circuit is disabled.

In yet another example, an apparatus comprises: one or more execution means for executing instructions; a first memory means having a first protection means for providing soft error protection to the first memory means; and protection control means, in response to an update to an operating voltage to be provided to the apparatus, for disabling the first protection means.

In an example, the protection control means is to send a disable signal to cause the first protection means to be disabled.

In an example, the protection control means is to send the disable signal in response to a determination that the update to the operating voltage exceeds a first protection threshold.

In an example, the protection control means, in response to a determination that the update to the operating voltage exceeds a second protection threshold, for disabling a plurality of protection means.

In an example, the apparatus further comprises a power control means to update the operating voltage in response to an indication that the first protection means has been disabled.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core including one or more execution units, a first memory array having a first protection circuit to provide soft error protection to the first memory array, and a control circuit; and
   a power controller including a protection control circuit, in response to an update to an operating voltage to be provided to the core, to cause the core to disable the first protection circuit, wherein the power controller is to reduce a dynamic capacitance of the processor when the first protection circuit is disabled.

2. The processor of claim 1, wherein the protection control circuit is to send a disable signal to the core to cause the core to disable the first protection circuit.

3. The processor of claim 2, wherein the protection control circuit is to send the disable signal in response to a determination that the update to the operating voltage exceeds a first protection threshold.

4. The processor of claim 3, wherein the protection control circuit is, in response to a determination that the update to the operating voltage exceeds a second protection threshold, to cause the core to disable a plurality of protection circuits.

5. The processor of claim 1, wherein the protection control circuit is to send an acknowledgement to the power controller to indicate that the first protection circuit has been disabled.

6. The processor of claim 5, wherein the power controller is to cause the update to the operating voltage to be provided to the core in response to receipt of the acknowledgement.

7. The processor of claim 1, wherein in response to a determination that a second update to the operating voltage is less than the first protection threshold, the protection control circuit is to cause the core to enable the first protection circuit.

8. The processor of claim 1, wherein the protection control circuit is to flush the first memory array before the first protection circuit is disabled.

9. The processor of claim 1, wherein after the first protection circuit is disabled, the first memory array is to write data into a first entry of the first memory array and reset a protection validity indicator associated with the first entry to indicate that the data stored in the first entry is not protected.

10. The processor of claim 1, wherein after the first protection circuit is disabled, the first memory array is to read data stored in a second entry of the first memory array without analysis of information stored in a protection field associated with the second entry.

11. The processor of claim 1, wherein the first protection circuit is to provide at least one of parity protection and error correction coding protection to the first memory array.

12. A non-transitory machine-readable medium having stored thereon instructions, which if performed by a machine cause the machine to perform a method comprising:
   determining whether an updated operating voltage at which a domain of a processor is to operate exceeds a first protection threshold, the domain including at least one core;
   in response to determining that the updated operating voltage exceeds the first protection threshold, identifying at least one protection circuit of the domain to disable;
   sending a protection disable command to the domain to cause the at least one protection circuit to be disabled; and
   thereafter causing an update to the operating voltage to the updated operating voltage, after receiving an acknowledgement of the protection disable command from the domain.

13. The non-transitory machine-readable medium of claim 12, wherein the method further comprises:
   determining whether the updated operating voltage at which the domain is to operate exceeds a second protection threshold, the second protection threshold greater than the first protection threshold; and
   in response to determining that the updated operating voltage exceeds the second protection threshold, identifying a plurality of protection circuits of the domain to disable.

14. The non-transitory machine-readable medium of claim 12, wherein the method further comprises in response to determining that a second updated operating voltage at which the domain is to operate is less than the first protection threshold, sending a protection enable command to the domain to cause the domain to re-enable the at least one protection circuit.

15. A system comprising:
   a processor having a plurality of cores, wherein a first core includes one or more execution units, a first storage having a first protection circuit to provide error protection to the first storage, and a control engine to dynamically disable the first protection circuit when an operating voltage of the first core exceeds a first threshold, wherein after the dynamic disable, the control engine is to dynamically enable the first protection circuit when the operating voltage of the first core is less than the first threshold, wherein responsive to a read operation to the first storage, the first core is to read data and perform a parity check based on parity information associated with the data when the first protection circuit is enabled, and read the data and not perform the parity check when the first protection circuit is disabled;
   a voltage regulator to provide one or more operating voltages to the processor; and
   a system memory coupled to the processor.

16. The system of claim 15, wherein the processor further comprises a power controller, in response to a determination to update the operating voltage of the first core to a level that exceeds the first threshold, to send a disable command to the processor to cause the control engine to disable the first protection circuit.

17. The system of claim 15, wherein:
- in a first mode of operation, the control engine is to flush the first storage prior to the dynamic disable of the first protection circuit; and
- in a second mode of operation, the control engine is to maintain contents of the first storage and dynamically disable the first protection circuit.

\* \* \* \* \*